(12) United States Patent
Huang (10) Patent No.: US 9,137,751 B2
(45) Date of Patent: Sep. 15, 2015

(54) CONCURRENT CONTROL METHOD FOR A COMMUNICATION DEVICE EMBEDDED WITH WI-FI DIRECT

(75) Inventor: Shun-Yong Huang, Taipei (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 34 days.

(21) Appl. No.: 13/212,154

(22) Filed: Aug. 17, 2011

(65) Prior Publication Data

US 2013/0044739 A1 Feb. 21, 2013

(51) Int. Cl.
*H04W 84/12* (2009.01)
*H04W 52/02* (2009.01)
*H04W 56/00* (2009.01)
*H04W 76/04* (2009.01)

(52) U.S. Cl.
CPC ...... *H04W 52/0216* (2013.01); *H04W 56/0015* (2013.01); *H04W 76/048* (2013.01); *Y02B 60/50* (2013.01)

(58) Field of Classification Search
USPC ........................................................ 370/338
See application file for complete search history.

(56) References Cited

U.S. PATENT DOCUMENTS

| | | | |
|---|---|---|---|
| 7,330,459 B2 * | 2/2008 | Chen et al. ..................... | 370/350 |
| 7,515,577 B2 * | 4/2009 | Pandey et al. .................. | 370/338 |
| 7,616,617 B2 * | 11/2009 | Pandey et al. .................. | 370/338 |
| 7,746,817 B2 * | 6/2010 | Matsunaga et al. ........... | 370/326 |
| 7,768,981 B1 * | 8/2010 | Donovan et al. ............... | 370/338 |
| 7,920,535 B2 * | 4/2011 | Zaks ............................. | 370/338 |
| 7,965,731 B2 * | 6/2011 | Sugita ............................ | 370/431 |
| 8,045,922 B2 * | 10/2011 | Sherman et al. .............. | 455/41.2 |
| 8,144,685 B2 | 3/2012 | Sakoda | |
| 8,218,516 B1 * | 7/2012 | Donovan et al. ............... | 370/338 |
| 8,254,996 B2 * | 8/2012 | Shuai ............................ | 455/561 |
| 8,270,342 B2 * | 9/2012 | Yang et al. ..................... | 370/324 |
| 8,391,257 B2 * | 3/2013 | Sakoda .......................... | 370/338 |
| 8,391,260 B1 * | 3/2013 | Kopikare et al. ............. | 370/338 |
| 2004/0076186 A1 | 4/2004 | Chen | |
| 2005/0101257 A1 | 5/2005 | Prat | |
| 2005/0243794 A1 * | 11/2005 | Yoon et al. ..................... | 370/347 |
| 2009/0097464 A1 * | 4/2009 | Sakoda ........................ | 370/338 |
| 2010/0020746 A1 * | 1/2010 | Zaks ............................. | 370/328 |
| 2011/0002315 A1 * | 1/2011 | Yoo ............................... | 370/338 |
| 2011/0076945 A1 * | 3/2011 | Chang et al. ................. | 455/41.2 |
| 2011/0082940 A1 * | 4/2011 | Montemurro et al. ........ | 709/227 |
| 2011/0188391 A1 * | 8/2011 | Sella et al. ..................... | 370/252 |

FOREIGN PATENT DOCUMENTS

| | | |
|---|---|---|
| CN | 101455105 | 6/2009 |
| CN | 101480087 | 7/2009 |
| CN | 101662816 B | 3/2014 |

* cited by examiner

*Primary Examiner* — Jackie Zuniga Abad
*Assistant Examiner* — Lakeram Jangbahadur
(74) *Attorney, Agent, or Firm* — Winston Hsu; Scott Margo (57) ABSTRACT

A concurrent control method for a communication device embedded with Wi-Fi Direct includes dynamically adjusting a target beacon transmission time (TBTT) of a Wi-Fi Direct connection according to a time difference between the TBTT of the communication device and a nearest TBTT of a wireless local area network access point (WLAN AP) and whether a channel for the Wi-Fi Direct connection and a channel for the WLAN connection are different.

11 Claims, 10 Drawing Sheets

CONCURRENT CONTROL METHOD FOR A COMMUNICATION DEVICE EMBEDDED WITH WI-FI DIRECT

BACKGROUND OF THE INVENTION

The present invention relates to a concurrent control method for a communication device embedded with Wi-Fi Direct, and more particularly, to a concurrent control method to handle network scheduling and power saving when the communication device acts as a peer-to-peer (P2P) group owner and at the same time connects with a conventional wireless local area network (WLAN) access point (AP).

Wi-Fi Direct is a wireless communication protocol that allows Wi-Fi devices to communicate with each other without connecting to a traditional WLAN AP, which increases connectivity and a great number of P2P applications. Wi-Fi Direct is simply a software-only protocol and can be built into any Wi-Fi device. With a growing demand for Wi-Fi Direct application, the scenario of two or more protocols coexistence, e.g. a legacy WLAN protocol such as IEEE 802.11a/g/n coexisting with Wi-Fi Direct, or a 3G/4G protocol coexisting with Wi-Fi Direct, is applied in kinds of communication devices as laptops, smart phones and multimedia devices which are embedded with Wi-Fi Direct.

Figure 1:
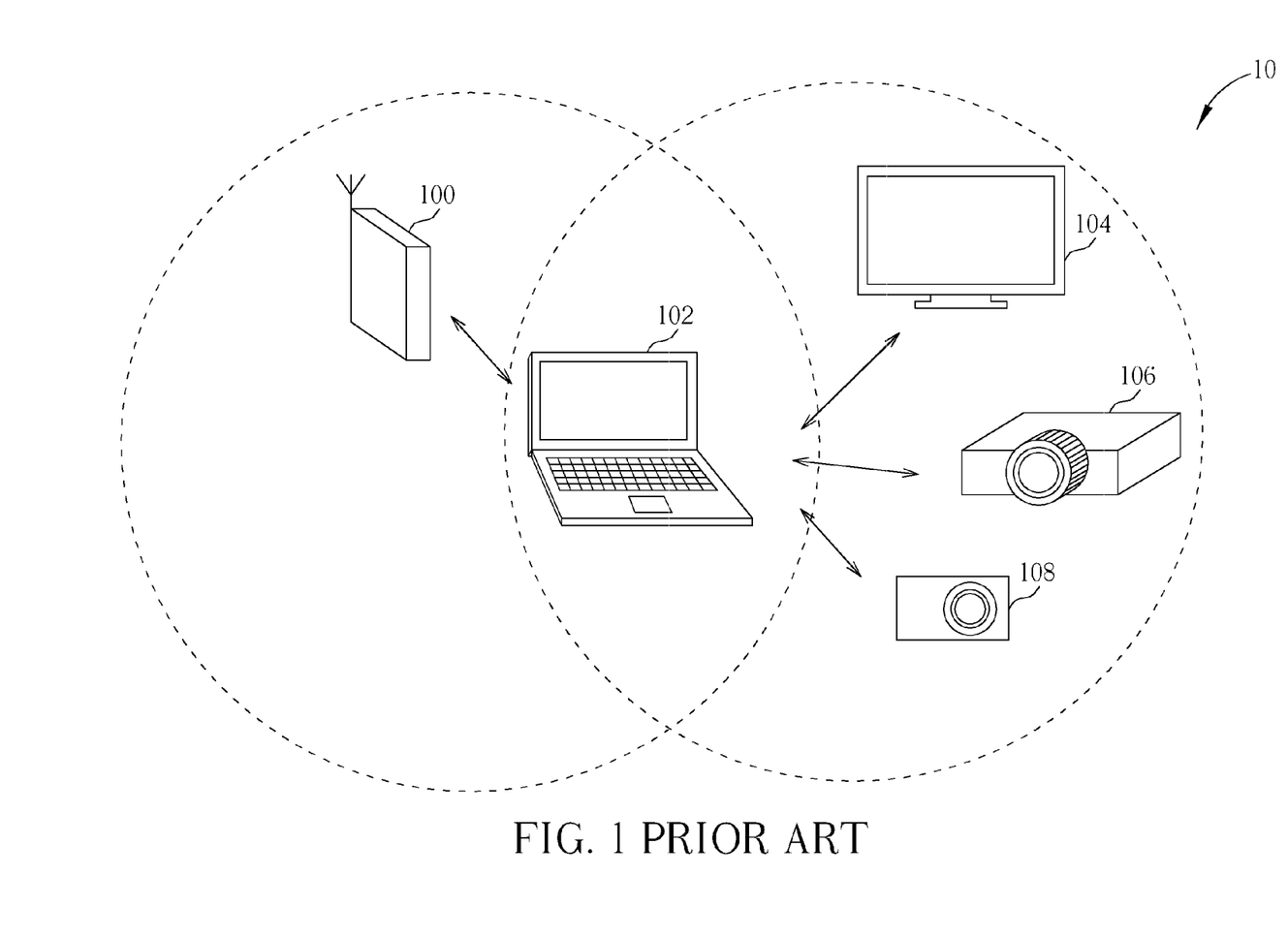
FIG. 1 is a diagram of a wireless network according to the prior art.

Please refer to FIG. 1, which is a diagram of a wireless network 10, including a WLAN AP 100, a communication device 102 which is embedded with a legacy WLAN protocol and Wi-Fi Direct as a laptop, and devices 104, 106 and 108 as a TV, a projector, or a digital camera. The left half of the wireless network 10 illustrates a traditional WLAN where the communication device 102 is a client station of a base service set (BSS) and can access the internet through the WLAN AP 100. The right half of the wireless network 10 illustrates a P2P network where the communication device 102 is a P2P group owner acting as an AP and connects with the devices 104, 106 and 108 as P2P client devices. The communication device 102 can access the internet through the WLAN AP 100 and use P2P services at the same time. In addition, the communication device 102 may connect with a Bluetooth embedded device or may access 3G/4G network and also use P2P services at the same time.

Timing synchronization function (TSF) is specified in IEEE 802.11 WLAN standards to achieve timing synchronization by periodically exchanging timing information through beacons. An AP in a BSS transmits beacons periodically to all client stations in the same BSS and each beacon includes a timestamp, which indicates the value of a TSF timer of the AP, and a beacon interval, which indicates the distance between two beacons. Beacons are sent at every target beacon transmission time (TBTT). Each client station in the BSS also maintains a local TSF timer counting in increments of microseconds, so they can miss a beacon and still remain roughly synchronized with the TSF timer of the AP. Upon receiving a beacon, a client station sets its local TSF timer to the timestamp included in the received beacon if the timestamp is later than its local TSF timer.

Figure 2:
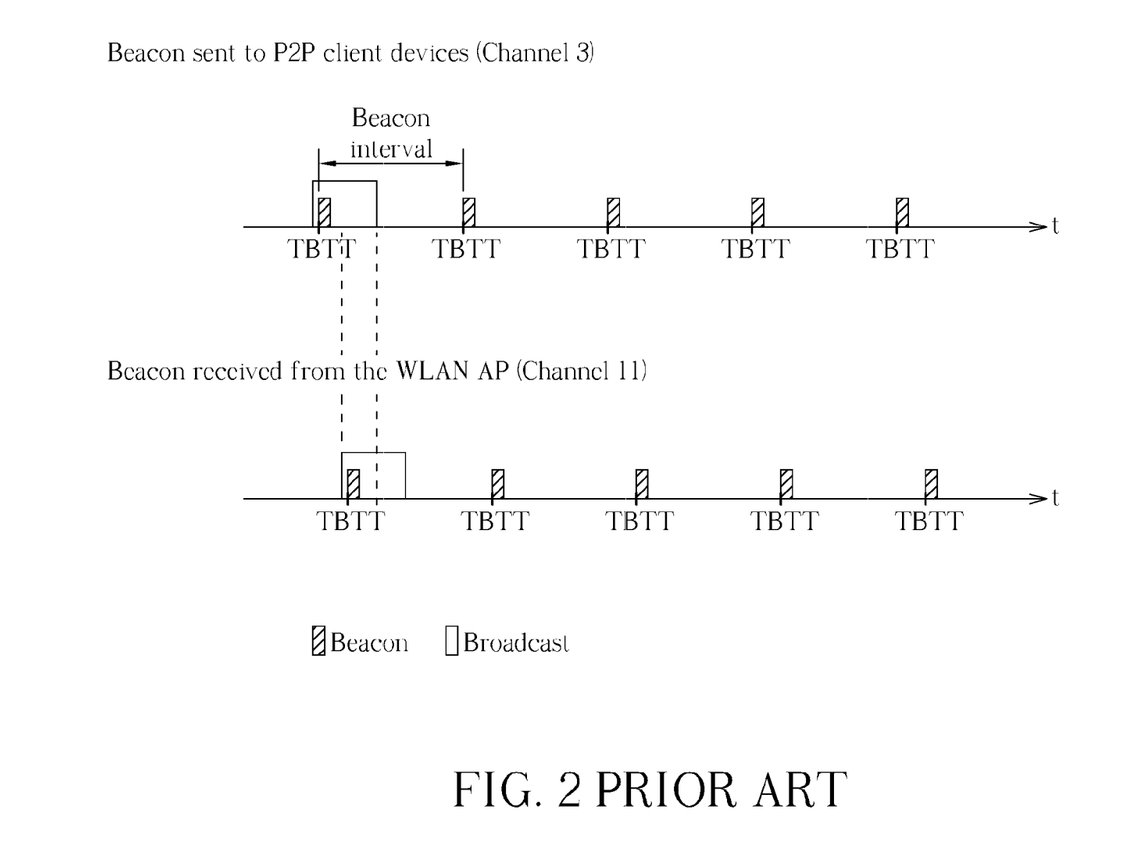
FIG. 2 and FIG. 3 are diagrams of beacon transmission of a communication device embedded with a legacy WLAN protocol and Wi-Fi Direct.

Please refer to FIG. 2, which is a diagram of beacon transmission of the communication device 102, illustrating beacons sent to P2P client devices and beacons received from the WLAN AP 100 in the condition that the P2P network and the BSS of the WLAN AP 100 operate on different channels, e.g. channel 3 and channel 11. As shown in FIG. 2, the communication device 102 establishes the P2P network first and connects to the WLAN AP 100 later. Since the communication device 102 acts as an AP, it periodically sends beacons to the P2P client devices 104, 106 and 108 at every TBTT and sends broadcast/unicast frame (if any) after TBTT. After the connection with the WLAN AP 100 is established, the communication device 102 starts to listen to beacons from the WLAN AP 100 at TBTTs of the WLAN AP 100.

Note that, in the case of the communication device 102 implemented by a single MAC/PHY solution, the communication device 102 has to switch between channels if the established P2P network and the BSS of the WLAN AP 100 operates on different channels. However, as shown in FIG. 2, when TBTT of the WLAN AP 100 is close to TBTT of the communication device 102, the communication device 102 is unable to switch from channel 3 to channel 11 to receive beacons from the WLAN AP 100 because it needs time to send beacons and broadcast frames to P2P client devices. As a result, the connection with the WLAN AP 100 may be suffered from the increasing of buffered packet delay time due to the lost of WLAN AP's beacon. On the other hand, if the communication device 102 switches from channel 3 to channel 11 to listen to beacons and broadcast frames sent from the WLAN AP 100, P2P network performance degrades due to information leakage.

Therefore, when the WLAN AP establishes the WLAN connection with the communication device 102 by using a channel different from the communication device uses to establish P2P network, it is hard to do fast network scheduling on an overlapping period of the broadcast frames of the communication device 102 and the WLAN AP 100.

Figure 3:
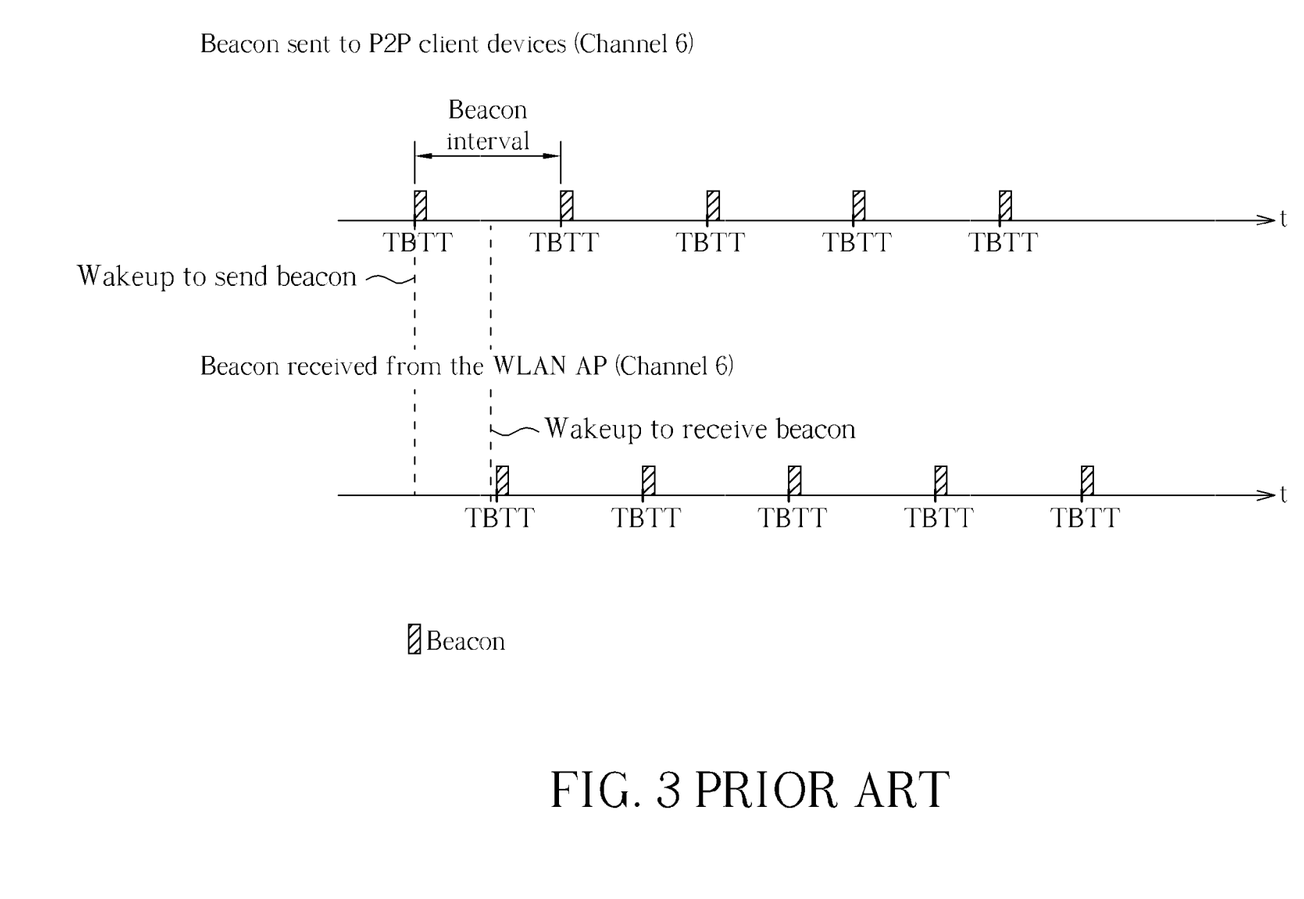

Please refer to FIG. 3, which is a diagram of beacon transmission of the communication device 102 in the condition that the P2P network and the BSS of the WLAN AP 100 operate on the same channel, e.g. channel 6. Similar to the illustrated in FIG. 2, the communication device 102 establishes the P2P network first and then connects to the WLAN AP 100. As shown in FIG. 3, TBTT of the WLAN AP 100 is far away from TBTT of the communication device 102, and the communication device 102 has to wake up to listen beacons during each period of the power saving mode of a P2P group owner. Thus, power consumption increases. Besides, if the communication device 102 is also embedded with a TDMA-based protocol, TBTT of the communication device 102 may collide with an important time slot when it communicates with a TDMA-based communication device after the P2P network is established.

Therefore, concurrent operation of Wi-Fi Direct and a traditional WLAN protocol or a TDMA-based protocol is a major consideration to improve Wi-Fi Direct application.

SUMMARY OF THE INVENTION

It is therefore a primary objective of the claimed invention to provide a concurrent control method for a communication device embedded with Wi-Fi Direct.

According to an embodiment of the present invention, A concurrent control method for a communication device embedded with Wi-Fi Direct includes dynamically adjusting a target beacon transmission time (TBTT) of a Wi-Fi Direct connection according to a time difference between the TBTT of the communication device and a nearest TBTT of a wireless local area network access point (WLAN AP) and whether a channel for the Wi-Fi Direct connection and a channel for the WLAN connection are different.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ." Also, the term "couple" is intended to mean either an indirect or direct electrical connection. Accordingly, if one device is coupled to another device, that connection may be through a direct electrical connection, or through an indirect electrical connection via other devices and connections.

Figure 4:
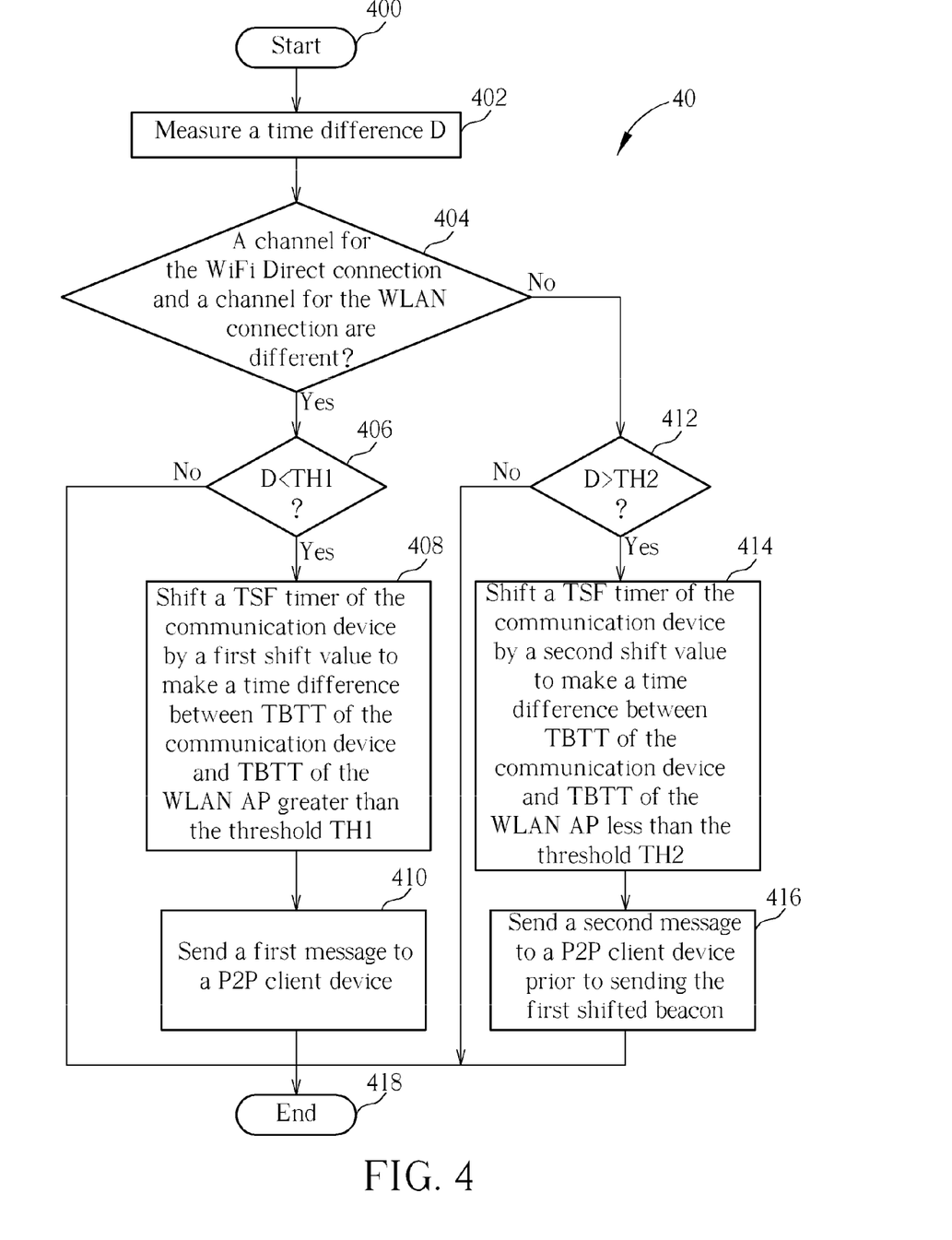
FIG. 4 is a flowchart of a process according to an embodiment of the present invention.

Please refer to FIG. 4, which is a flowchart of a process 40 according to an embodiment of the present invention. The process 40 is utilized in a communication device embedded with at least a WLAN protocol, e.g. IEEE 802.11a/g/n and Wi-Fi Direct, such as the communication device 102 in FIG. 1. The process 40 is performed under a condition that when the communication device acts as a P2P group owner, first establishes a Wi-Fi Direct connection (also called P2P connection) with P2P client devices and later establishes a WLAN connection with a WLAN AP. After the WLAN connection is established, the communication device performs the process 40 to control concurrent operation of the WLAN protocol and Wi-Fi Direct, for improving network scheduling and reducing power consumption as illustrated in FIG. 2 and FIG. 3. The process 40 comprises the following steps:

Step 400: Start.

Step 402: Measure a time difference D between a TBTT of the communication device and a nearest, TBTT of the WLAN AP for timing synchronization of the communication device.

Step 404: Check whether a channel for the Wi-Fi Direct connection and a channel for the WLAN connection are different. If yes, perform 406; else, perform Step 412.

Step 406: Check whether the time difference D is less than a threshold TH1. If yes, perform Step 408; else, perform Step 418.

Step 408: Shift a time synchronization function (TSF) timer of the communication device by a first shift value to make a time difference between TBTT of the communication device and TBTT of the WLAN AP greater than the threshold TH1.

Step 410: Send a first message including the timestamp of the TSF timer of the communication device to a P2P client device for updating a TSF timer of the P2P client device, wherein the first message to the P2P client device is sent prior a first shifted beacon.

Step 412: Check whether the time difference D is larger than a threshold TH2. If yes, perform Step 414; else, perform Step 418.

Step 414: Shift a TSF timer of the communication device by a second shift value to make a time difference between TBTT of the communication device and TBTT of the WLAN AP less than the threshold TH2.

Step 416: Send a second message including the timestamp of the TSF timer of the communication device to a P2P client device prior to sending the first shifted beacon, to update a TSF timer of the P2P client device.

Step 418: End.

Please note that, the process 40 is preferred to be utilized in the communication device (as the P2P group owner) which has a beacon interval identical to the beacon interval of the WLAN AP. In order to realize the process 40, please also refer to FIG. 5 and FIG. 6, which are diagrams of beacon transmission of the communication device performing the process 40, including beacons sent to P2P client devices and beacons received from the WLAN AP, based on different condition that the channel for the Wi-Fi Direct connection and the channel for the WLAN connection are different or the same. The beacon interval of the communication device and the beacon interval of the WLAN AP are the same, e.g. 100 ms.

Figure 5:
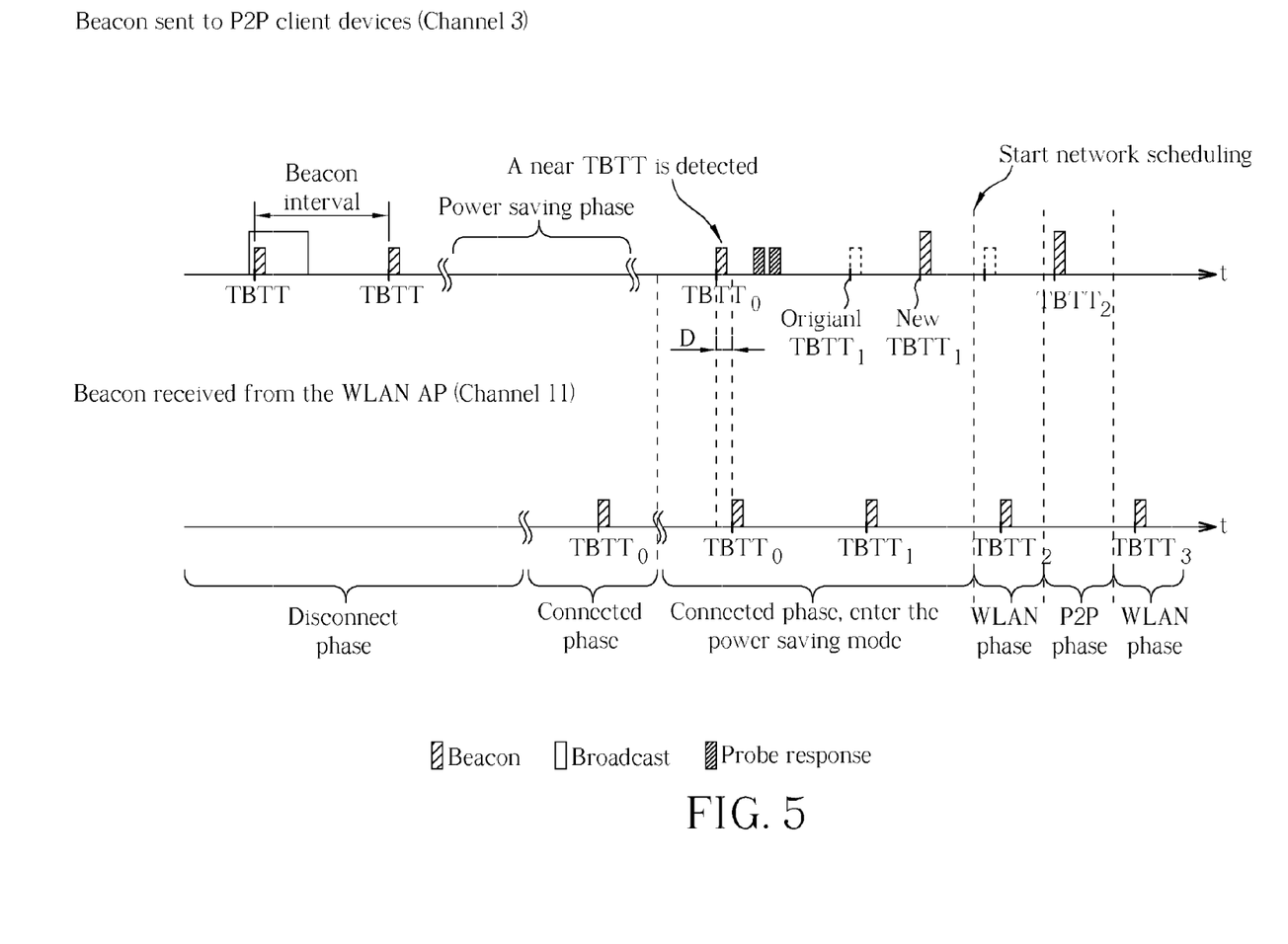
FIG. 5 and FIG. 6 are diagrams of beacon transmission of a communication device using the process of FIG. 4.
Figure 6:
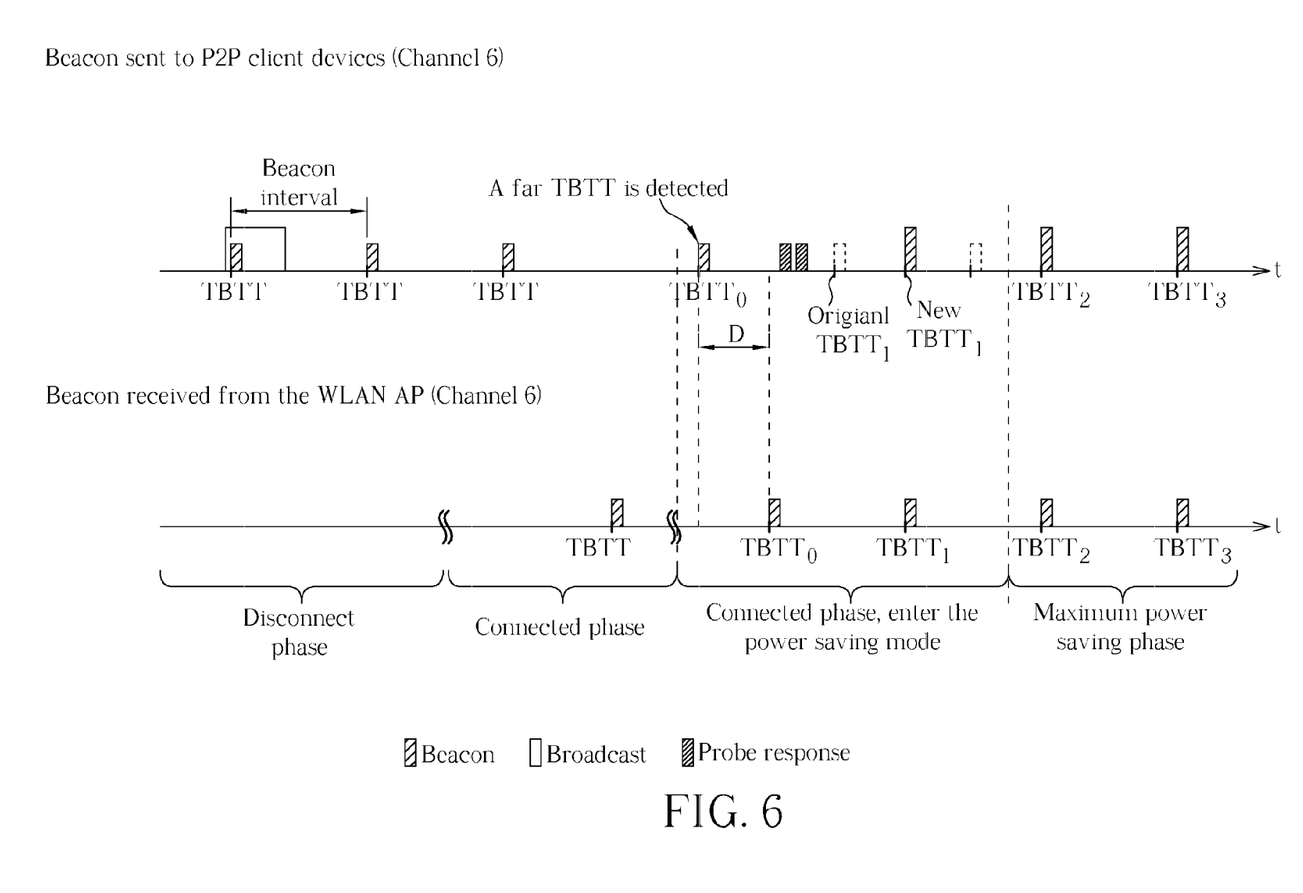

As shown in FIG. 5, since the Wi-Fi Direct connection and the WLAN connection are established on different channels, the communication device has to enter a power saving mode (relative to the P2P network) to switch channel to establish the WLAN connection. As shown in FIG. 6, since the Wi-Fi Direct connection and the WLAN connection are on the same channel, the communication device can directly establish the WLAN connection without switching channel. As a P2P group owner, the communication device knows its own beacon interval and its local TSF timer. During the establishment of WLAN connection (that is, the period that communication device enters the connected phase), the communication device can obtain information about the value of TSF timer of the WLAN AP and the beacon interval of the WLAN AP, and performs the process 40.

The process 40 is described in detail as follows. According to Step 402, the communication device measures a time difference between a TBTT of the communication device and a nearest, TBTT of the WLAN AP for timing synchronization of the communication device, denoted as D as shown in FIG. 5. Please note that, the communication device can measure the time difference D in advance without waiting until actual TBTT of the WLAN AP because TBTT of the WLAN AP can be derived according to the TSF timer of the WLAN AP, which is known to the communication device during the establishment of WLAN connection.

Then, the communication device can compare the time difference D with at least one threshold to determine whether shifting a time synchronization function (TSF) timer of the communication device. Specifically, according to Step 404, the communication device checks whether the channel used for the Wi-Fi Direct connection and the channel used for the WLAN connection are different. When the used channels are different, according to Step 406, the communication device further checks whether the time difference D is less than a threshold TH1. The threshold TH1 can be the minimum time difference the communication device requires for switching channels, such as switching from channel 3 to channel 11 as illustrated in FIG. 5. If the time difference D is less than the threshold TH1, the communication device will not be able to switch to other channel to receive a beacon from the WLAN AP; in opposite, if the time difference D is larger than the threshold TH1, the communication device has enough time to switch channel to receive a beacon from the WLAN AP and there is no problem to do network scheduling of Wi-Fi Direct and WLAN.

On the other side, when the channel used for the Wi-Fi Direct connection and the channel used for the WLAN connection are the same, according to Step 412, the communication device further checks whether the time difference D is larger than a threshold TH2. The threshold TH2 can be the maximum time difference between the two TBTTs which makes the communication device to have a least acceptable efficiency of power consumption. If the time difference D is larger than the threshold TH2, the TBTT of the WLAN AP may be far away from a nearest, earlier TBTT of the communication device and out of the Wi-Fi Direct connected phase so that the communication device has to wake up to receive a beacon when it is already in the power saving mode. In opposite, if the time difference D is smaller than the threshold TH2, the communication device may have much time staying in the power saving mode and get better efficiency of power consumption.

Briefly, according to Steps 402, 404 and 406, the communication device determines whether TBTT of the communication device and TBTT of the WLAN AP are too close to switch channel; and according to Steps 402, 404 and 412, the communication device determines whether TBTT of the communication device and TBTT of the WLAN AP are too far away to maintain acceptable efficiency of power consumption.

Steps 408, 410, 414 and 416 carry out the essential concept of the present invention, that is, to shift the TSF timer of the P2P group owner and inform the P2P client devices in advance.

When the measured time difference D is less than the threshold TH1, according to Step 408 and Step 410, the communication device shifts its TSF timer by a first shift value to make a time difference between TBTT of the communication device and TBTT of the WLAN AP greater than the threshold TH1, and the communication device sends a first message including the timestamp of its TSF timer to a P2P client device for updating a TSF timer of the P2P client device, wherein the first message is sent prior a first shifted beacon, so that the P2P client device can receive beacons at shifted TBTTs. The first message may be a beacon or a probe response. By using Step 408 and Step 410, the communication device as the P2P group owner has enough time to finish broadcast to all the P2P client devices and then switches to receive a beacon from the WLAN AP. Please note that, the communication device can shift its own TSF timer earlier or later, as long as enough time for switching between channels is provided.

FIG. 5 illustrates the effect of the process 40. In FIG. 5, TBTTs of the communication device and TBTTs of the WLAN AP after the WLAN connection is established are numbered in sequence as $TBTT_0$, $TBTT_1$, $TBTT_2$, etc. As shown in FIG. 5, the process 40 is performed after the communication device enters the WLAN connected phase, and as a result, the time difference D is measured, different channels (channel 3 and channel 11) for the Wi-Fi Direct connection and the WLAN connection is detected, the TSF timer of the communication device is shifted later so that new $TBTT_1$ is later than the original time, and two probe responses are sent to different P2P client devices before the new $TBTT_1$ when the first shifted beacon will be sent. Therefore, each P2P client device receives a probe response which announces that the TSF timer of the P2P group owner is shifted, and thereby the P2P client device is able to update its own TSF timer accordingly. In another embodiment, the communication device can also carry the timestamp of the shifted TSF timer in a beacon, and can send this beacon as soon as possible after the WLAN connection is established, e.g. send a beacon as the first message at $TBTT_1$, in place of the probe response.

On the other hand, when the measured time difference D is larger than the threshold TH2, Step 414 and Step 416 are performed. The communication device shifts its TSF timer by a second shift value to make a time difference between TBTT of the communication device and TBTT of the WLAN AP less than the threshold TH2, and prior to sending the first shifted beacon, the communication device sends a second message including the timestamp of its TSF timer to the P2P client device, for updating the TSF timer of the P2P client device. The second message may be a beacon or a probe response. The communication device can shift its own TSF timer earlier or later, as long as the time difference between TBTT of the communication device and TBTT of the WLAN AP is as close as possible, to be able to stay in a longer power saving phase and have lower power consumption.

In a preferred embodiment of Step 404, based on the condition that the beacon interval of the communication device and the beacon interval of the WLAN AP are the same, the communication device shifts its TSF timer to make zero time difference between TBTT of the communication device and TBTT of the WLAN AP. That is, TBTT of the communication device and TBTT of the WLAN AP are aligned, which helps the communication device to have the maximum time staying in the power saving mode.

FIG. 6 also illustrates the effect of the process 40. As shown in FIG. 6, the process 40 is performed after the communication device enters the WLAN connected phase and the time difference D is measured, identical channel (channel 6) for the Wi-Fi Direct connection and the WLAN connection is detected, the TSF timer of the communication device is shifted later so that new $TBTT_1$ is later than the original time, and two probe responses are sent to different P2P client devices before the new $TBTT_1$. Therefore, each P2P client device is able to update its own TSF timer according to the received probe response. In another embodiment, the communication device can also carry the timestamp of the shifted TSF timer in a beacon and can send this beacon as the second message at $TBTT_1$, in place of the probe response.

Please note that a beacon is a broadcast message to all the P2P client devices and a probe response is a unicast message. The P2P client device has to reply an acknowledgement or non-acknowledgement with respect to a received probe response. Therefore, it is better to use a probe response as the message carrying the timestamp of the TSF timer since the communication device can make sure that the P2P client device indeed receives information of the shifted TSF timer or not, according to the acknowledgement. In another embodiment, the communication device can send both a beacon and a probe response, for increasing the opportunity for the P2P client device to update its TSF timer.

The process 40 is one of embodiments of the present invention, performed based on that the beacon interval of the communication device as a P2P group owner and the beacon interval of the WLAN AP are the same. However, the beacon interval of the communication device may not always be the same as the beacon interval of the WLAN AP; one of them may change its own setting, or the communication device may handover to connect with another WLAN AP using a different beacon interval. Therefore, those skilled in the art can make alteration and modification accordingly.

Figure 7:
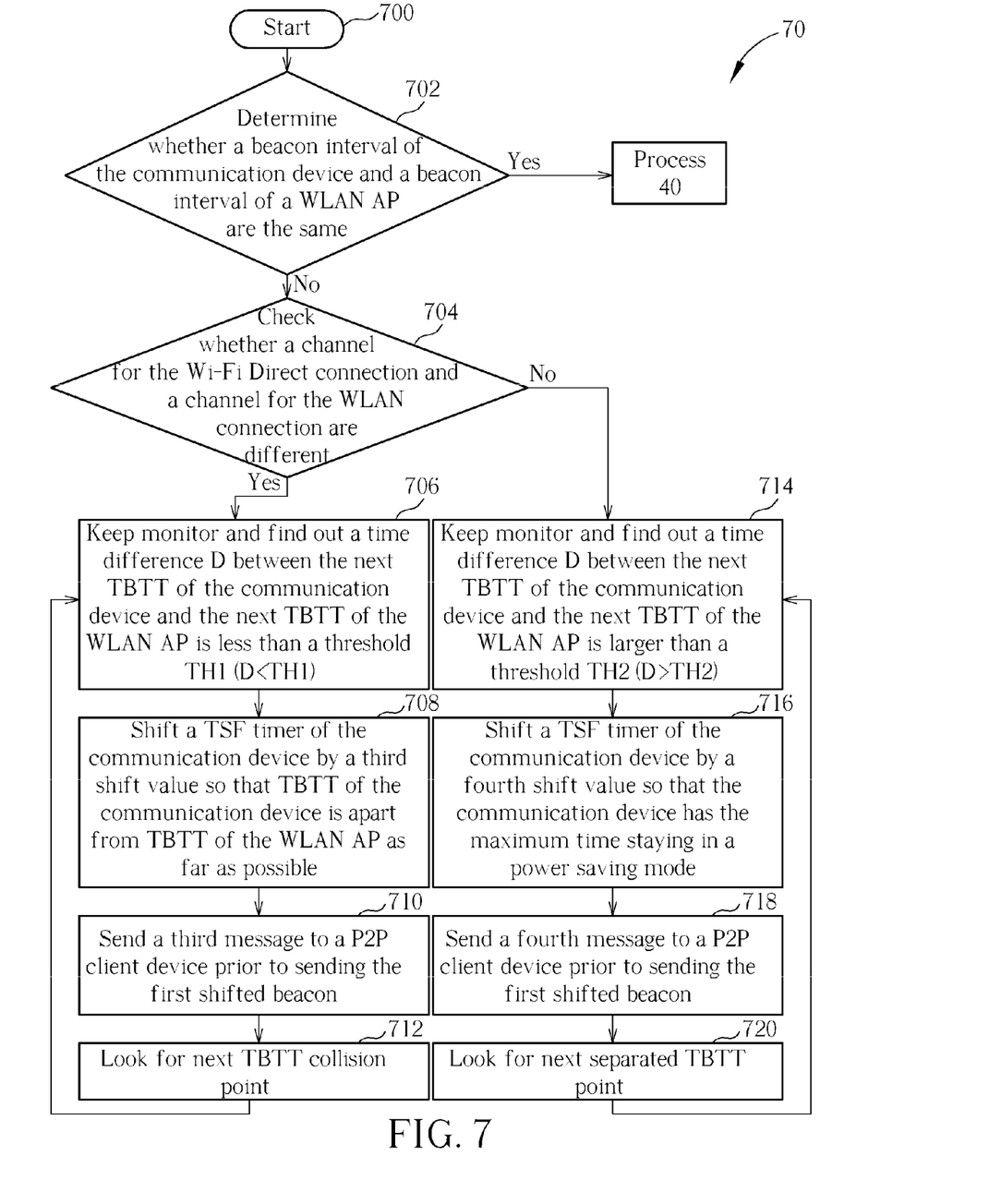
FIG. 7 is a flowchart of a process according to an embodiment of the present invention.

Please refer to FIG. 7, which is a flowchart of a process 70 according to an embodiment of the present invention. The process 70 covers a larger scope including the process 40 of FIG. 4 since whether the beacon interval is identical or different is taken into account. The process 40 is also utilized in a communication device as the communication device 102 in FIG. 1, and is performed for controlling concurrent operation of the traditional WLAN protocol and Wi-Fi Direct. The process 70 comprises the following steps:

Step 700: Start.

Step 702: Determine whether a beacon interval of the communication device and a beacon interval of a WLAN AP are the same. If yes, perform the process 40; else, perform Step 704.

Step 704: Check whether a channel for the Wi-Fi Direct connection and a channel for the WLAN connection are different. If yes, perform 706; else, perform Step 714.

Step 706: Find out if next TBTT of the communication device and the next TBTT of the WLAN AP will get collision in advance. In another word, to find out a time difference D between the next TBTT of the communication device and the next TBTT of the WLAN AP is less than a threshold TH1.

Step 708: Shift a TSF timer of the communication device by a third shift value so that TBTT of the communication device is apart from TBTT of the WLAN AP as far as possible.

Step 710: Send a third message including the timestamp of the TSF timer of the communication device to a P2P client device prior to sending the first shifted beacon, to update a TSF timer of the P2P client device.

Step 712: Go back to Step 706 to look for next TBTT collision point.

Step 714: Find out if next TBTT of the communication device and the next TBTT of the WLAN AP will get separation in advance. In another word, to find out a time difference D between the next TBTT of the communication device and the next TBTT of the WLAN AP is larger than a threshold TH2.

Step 716: Shift a TSF timer of the communication device by a fourth shift value so that the communication device has the maximum time staying in a power saving mode.

Step 718: Send a fourth message including the timestamp of the TSF timer of the communication device to a P2P client device prior to sending the first shifted beacon, to update a TSF timer of the P2P client device.

Step 720: Go back to Step 714 to look for next separated TBTT point.

The process 70 is taken while a Wi-Fi Direct connection is established prior a WLAN connection, wherein the WLAN connection is established between the communication device and the WLAN AP and the Wi-Fi Direct connection is established between the communication device as a P2P group owner and a P2P client device. After the WLAN connection is established, according to Step 702, the communication device determines whether its own beacon interval is the same as the beacon interval of the WLAN AP. When the beacon intervals are the same, the communication device performs the process 40; otherwise, according to Step 704, the communication device will check whether a channel for the Wi-Fi Direct connection and a channel for the WLAN connection are different and selectively perform Step 706 to Step 712; else, perform Step 714 to Step 720.

When the channel for the Wi-Fi Direct connection and the channel for the WLAN connection are different, according to Step 706, the communication device find out if next TBTT of the communication device and the next TBTT of the WLAN AP will get collision in advance. If found then according to Step 708 and Step 710, the communication device shifts its own TSF timer by a third shift value so that TBTT of the communication device is apart from TBTT of the WLAN AP as far as possible, and prior to sending a first shifted beacon, the communication device sends a third message including the timestamp of its TSF timer, which can be a beacon or a probe response, to the P2P client device. As a result, the communication device has enough time to switch channel and gets a better performance of network scheduling, and the P2P client device can update its own TSF timer according to the received beacon or probe response. Once finish the TSF shift adjustment, go back to Step 706 to find out next TBTT collision in advance.

When the channel for the Wi-Fi Direct connection and the channel for the WLAN connection are the same, according to Step 714, the communication device find out if next TBTT of the communication device and the next TBTT of the WLAN AP will get separation in advance. If found then according to Step 716 and Step 718, the communication device shifts its own TSF timer by a fourth shift value to make the communication device have the maximum time staying in the power saving mode and have the minimum power consumption, and prior to sending the first shifted beacon, the communication device sends a fourth message including the timestamp of its TSF timer, which can be a beacon or a probe response, to the P2P client device to update the TSF timer of P2P client device. Similarly, the fourth shift value may be generated according to the time difference D, the beacon interval of the communication device and the beacon interval of the WLAN AP.

Figure 8:
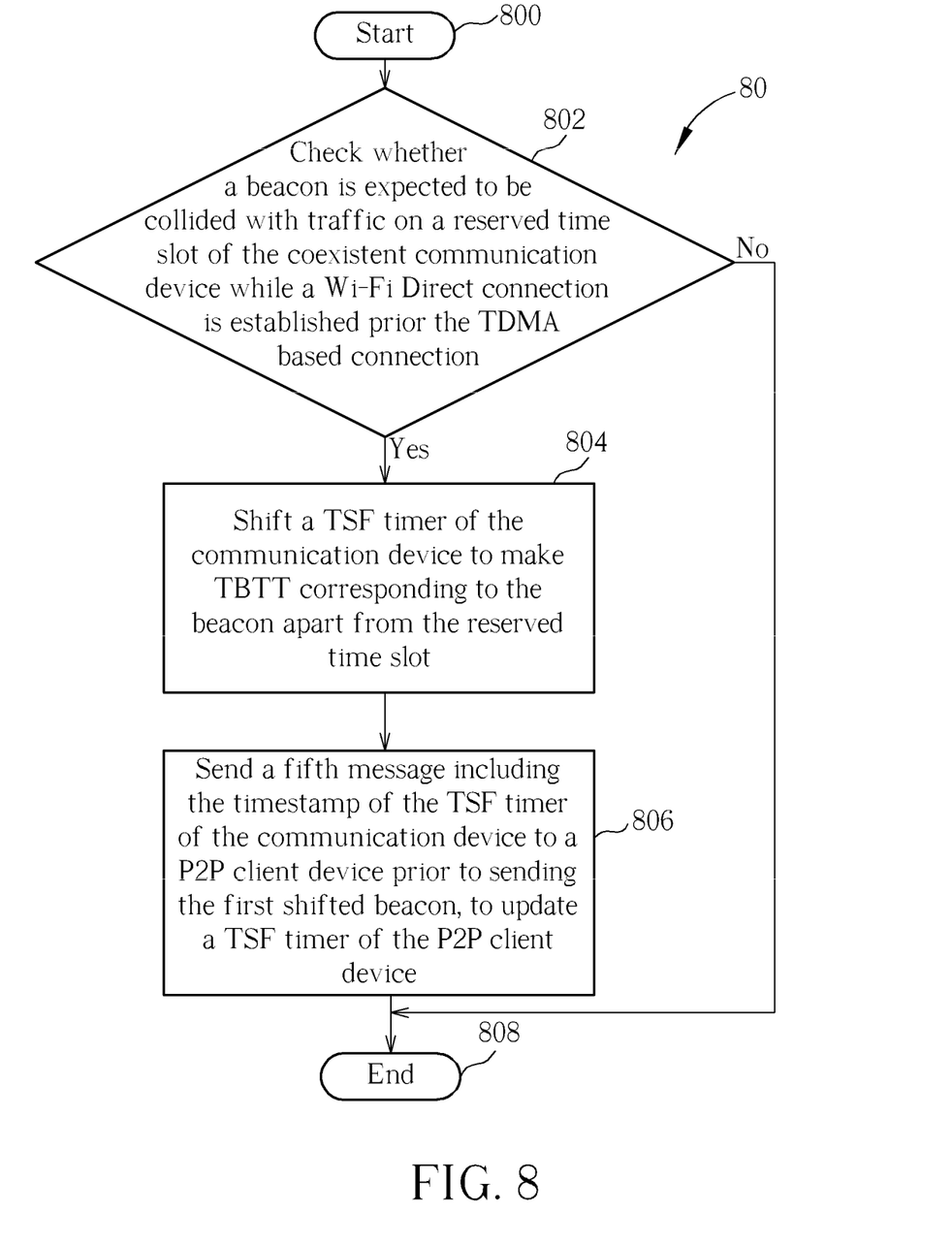
FIG. 8 is a flowchart of a process according to an embodiment of the present invention.

The idea of concurrent control for Wi-Fi Direct and a legacy WLAN protocol can also be used when the communication device embedded with Wi-Fi Direct is further embedded with a TDMA-based protocol, such as Bluetooth, 3G or 4G protocol. Please refer to FIG. 8, which is a flowchart of a process 80 according to an embodiment of the present invention. The process 80 comprises the following steps:

Step 800: Start.

Step 802: Check whether a beacon is expected to be collided with traffic on a reserved time slot of the coexistent communication device while a Wi-Fi Direct connection is established prior the TDMA based connection. If yes, perform Step 804; else, perform Step 808

Step 804: Shift a TSF timer of the communication device to make TBTT corresponding to the beacon apart from the reserved time slot.

Step 806: Send a fifth message including the timestamp of the TSF timer of the communication device to a P2P client device prior to sending the first shifted beacon, to update a TSF timer of the P2P client device.

Step 808: End

According to Step 802, when a Wi-Fi Direct connection is established prior a WLAN connection, the communication device checks whether a beacon sent to the P2P client device is expected to be collided with traffic on a reserved time slot used by the communication device, i.e. whether a TBTT collides with a reserved time slot. The reserved time slot can be a Bluetooth SCO (synchronous Connection-Oriented) reserved time slot for voice transmission, for example.

Usually, traffic of the TDMA-based communication device is given a higher priority than traditional WLAN/Wi-Fi Direct transmission since the TDMA-based communication device uses dedicated uplink/downlink resources, which is contention-free, and traditional WLAN/Wi-Fi Direct is contention-based. When the communication device knows that the beacon is expected to collide with traffic on the reserved time slot, according to Step 804, the communication device shifts its TSF timer by a fifth shift value, to make the TBTT apart from the reserved time slot. And prior to sending the first shifted beacon, the communication device sends a fifth message including the timestamp of its own TSF timer to a P2P client device, to update the TSF timer of the P2P client device. The fifth message can also be a beacon or a probe response.

Figure 9:
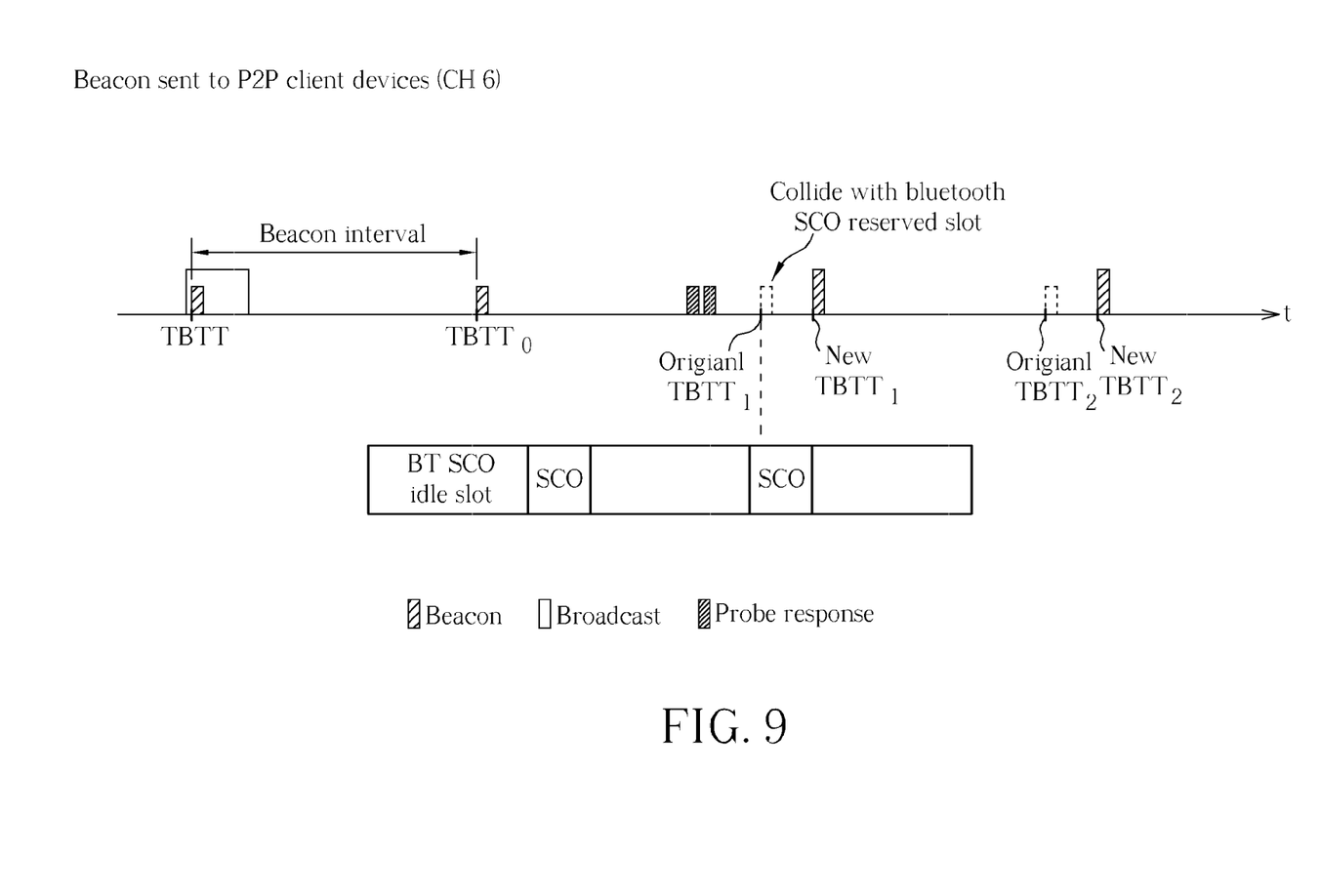
FIG. 9 and FIG. 10 are diagrams of beacon transmission of a communication device using the process of FIG. 8.
Figure 10:
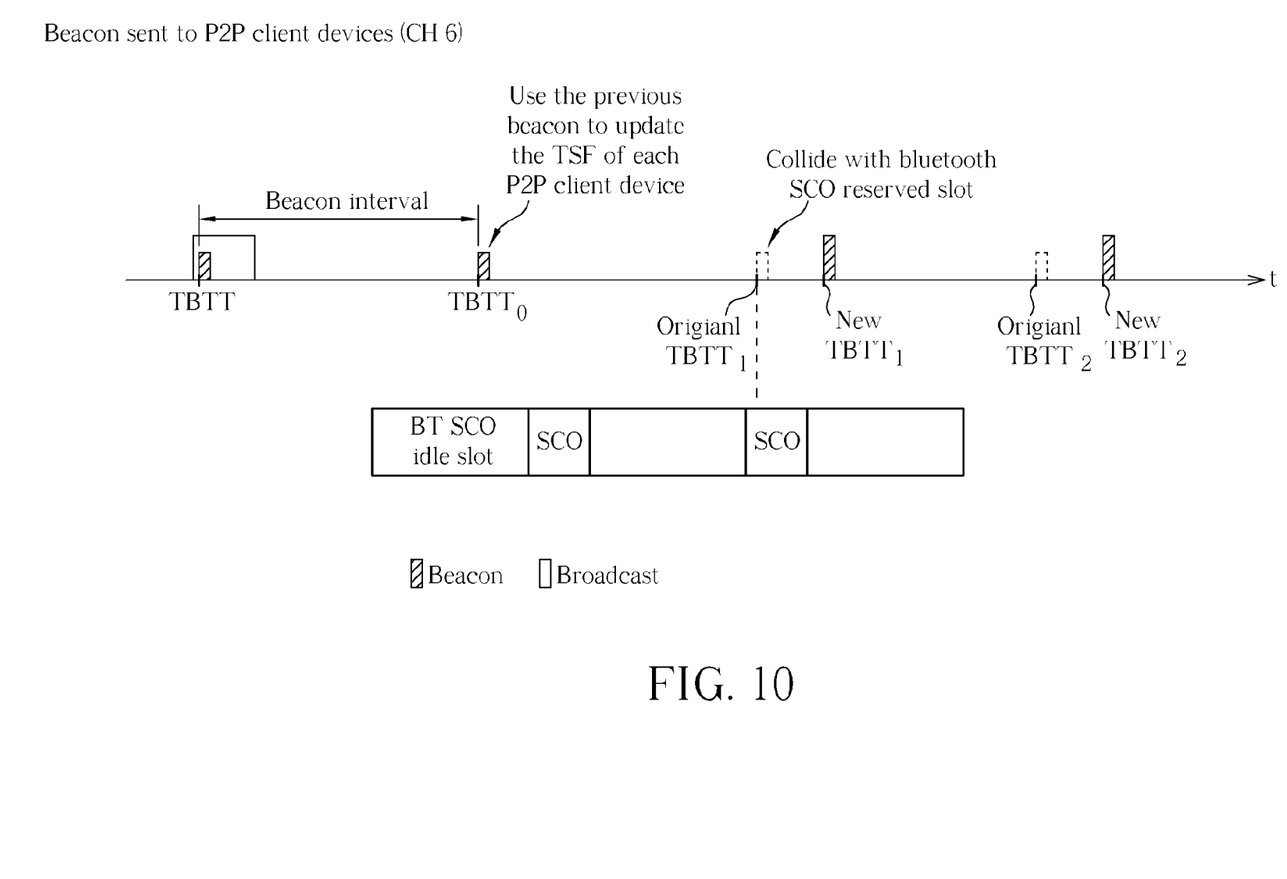

Please refer to FIG. 9 and FIG. 10, which are diagrams of beacon transmission and TDMA transmission in a communication device embedded with Wi-Fi Direct and a TDMA-based protocol. FIG. 9 and FIG. 10 illustrate the effect of the process 80 of FIG. 8. As shown in FIG. 9, the communication device shifts its TSF timer later and sends probe responses as the fifth messages to two P2P client devices before sending the first shifted beacon. As shown in FIG. 10, the communication device sends a beacon as the fifth message. In another embodiment, the communication device can also sent both a beacon and probe responses, to increase the opportunity for the P2P devices to update the TSF timer and thus improve performance of the Wi-Fi Direct connection.

In conclusion, through the above concurrent control processes, when the communication device embedded with Wi-Fi Direct and legacy WLAN sends beacons to P2P client devices after the WLAN connection is established, the communication device considers the channels used for Wi-Fi Direct connection and the WLAN connection and the time difference between TBTT of the communication device and TBTT of the WLAN AP, and therefore network scheduling and power consumption are greatly improved.

Those skilled in the art will readily observe that numerous modifications and alterations of the device and method may be made while retaining the teachings of the invention.

What is claimed is:

1. A concurrent control method for a communication device embedded with Wi-Fi Direct comprising:
    determining whether a beacon interval of the communication device and a beacon interval of the WLAN AP are the same;
    measuring a time difference between a target beacon transmission time (TBTT) of the communication device and a nearest target beacon transmission time (TBTT) of the WLAN AP when the beacon interval of the communication device and the beacon interval of the WLAN AP are the same;
    dynamically adjusting a target beacon transmission time (TBTT) of a Wi-Fi Direct connection according to the time difference between the TBTT of the communication device and a nearest TBTT of a wireless local area network access point (WLAN AP) and whether a channel for the Wi-Fi Direct connection and a channel for the WLAN connection are different
    comparing the time difference with at least one threshold to determine whether shifting a time synchronization function (TSF) timer of the communication device;
    when the channel for the Wi-Fi Direct connection and the channel for the WLAN connection are different and the time difference is less than a first threshold, shifting a time synchronization function (TSF) timer of the communication device to make the time difference between TBTT of the communication device and TBTT of the WLAN AP greater than the first threshold.

2. The concurrent control method of claim 1, wherein the determining step is taken while the Wi-Fi Direct connection is established prior a wireless local area network (WLAN) connection.

3. The concurrent control method of claim 2 further comprising:
    when the beacon interval of the communication device and the beacon interval of the WLAN AP are different, continuously measuring the TBTT of the communication device and the nearest next TBTT of the WLAN AP and check if meet the condition of specific threshold.

4. The concurrent control method of claim 3 further comprising:
    when the channel for the Wi-Fi Direct connection and the channel for the WLAN connection are different, shifting the TSF timer of the communication device so that TBTT of the communication device is apart from TBTT of the WLAN AP as far as possible, and sending a third message to a P2P client device prior to sending a first shifted beacon, for updating the TSF timer of the P2P client device.

5. The concurrent control method of claim 3 further comprising:
    when the channel for the Wi-Fi Direct connection and the channel for the WLAN connection are the same, shifting the TSF timer of the communication device so that the communication device has the maximum time staying in a power saving mode, and sending a fourth message to a P2P client device prior to sending the first shifted beacon, for updating the TSF timer of the P2P client device.

6. The concurrent control method of claim 1, further comprising: sending a first message to the P2P client device for updating a TSF timer of the P2P client device, wherein the first message to the P2P client device is sent prior a first shifted beacon.

7. The concurrent control method of claim 6, wherein the first message is a beacon.

8. The concurrent control method of claim 6, wherein the first message is a probe response.

9. The concurrent control method of claim 1, further comprising:
    when the channel for the Wi-Fi Direct connection and the channel for the WLAN connection are the same and the time difference is larger than a second threshold, shifting the TSF timer of the communication device to make the time difference between TBTT of the communication device and TBTT of the WLAN AP less than the second threshold.

10. The concurrent control method of claim 9, further comprising:
    sending a second message to the P2P client device prior to sending a first shifted beacon, for updating the TSF timer of the P2P client device.

11. The concurrent control method of claim 9, wherein shifting the TSF timer of the communication device to make the time difference between TBTT of the communication device and TBTT of the WLAN AP less than the second threshold comprises shifting the TSF timer of the communication device to make TBTT of the communication device and TBTT of the WLAN AP aligned.

* * * * *